Patented Aug. 5, 1952

2,606,204

UNITED STATES PATENT OFFICE 2,606,204

PREPARATION OF DINITRILES

Milton J. Hogsed and Robert M. Joyce, Wilmington, Del., assignors to E. I. du Pont de Nemours & Company, Wilmington, Del., a corporation of Delaware No Drawing. Application October 13, 1950, Serial No. 190,047

7 Claims. (Cl. 260—465.8)

This invention relates to new unsaturated dinitriles and to their hydrogenation products.

Diprimary amines having a chain of twelve carbon atoms between the two primary amino groups are of considerable technical interest as intermediates in the preparation of polyamides. However, there is no industrially practical method of preparing such diamines or the dinitriles from which they may be derived.

The primary product of this invention is a mixture comprising 5,8-dimethylenedodecanedinitrile,

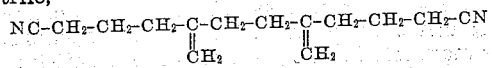

and its isomer, 5,8-dimethyl-4,8-dodecadienedinitrile,

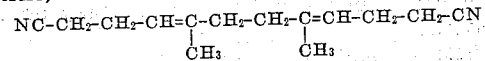

The hydrogenation products of these nitriles, that is, the saturated dinitrile, 5,8-dimethyldodecanedinitrile,

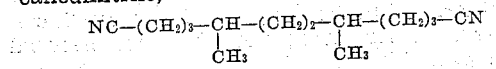

and the saturated diamine, 5,8-dimethyldodecamethylenediamine,

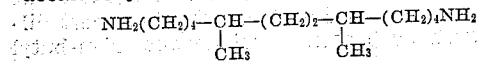

are also new compounds and part of this invention.

The dinitriles of this invention are prepared by a process which comprises chlorinating 5-methyl-5-hexenenitrile, whereby an unsaturated chloronitrile is obtained which is a mixture of 5-chloromethyl-5-hexenenitrile and 5-chloromethyl-4-hexenenitrile, and coupling the chloronitrile by means of nickel carbonyl with elemination of chlorine between two molecules. The reaction is represented by the following set of equations:

The two isomeric, doubly unsaturated dinitriles are obtained as a liquid mixture which is not readily separable by the usual methods such as distillation. It is probable that the mixture also contains some of the third possible position isomer, 5-methylene-8-methyl-8-dodecenedinitrile,

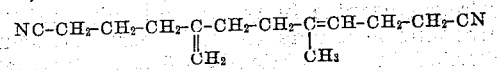

On hydrogenation, all of these isomers give, of course, the same saturated dinitrile, 5,8-dimethyldodecanedinitrile, and the same diamine, 5,8-dimethyldodecamethylenediamine.

The starting material in the synthesis outlined above is 5-methyl-5-hexenenitrile. This material is obtained readily and cheaply, as described and claimed in application Ser. No. 168,387, filed on June 15, 1950, by Albisetti and Fisher, by condensing isobutylene and acrylonitrile under non-polymerizing conditions. For the sake of completeness, a typical preparation of this compound is described below.

A pressure vessel is charged with 200 parts of isobutylene, 80 parts of acrylonitrile and 5 parts of hydroquinone (polymerization inhibitor) and heated at 235° C. for 4 hours. The maximum pressure developed is 950 atmospheres and there is a pressure drop of 500 atmospheres during the course of the reaction. Distillation of the reaction mixture gives 72 parts of 5-methyl-5-hexenenitrile, a colorless, clear liquid having a boiling point of 182° C. and a refractive index, $n_D^{25}$, of 1.4321.

The invention is illustrated in greater detail by the following examples in which parts are by weight.

Example 1.—A solution of 156 parts of 5-methyl-5-hexenenitrile in 700 parts of carbon tetrachloride was stirred and heated to reflux while 100 parts of chlorine gas was introduced through a gas dispersion tube over a two and

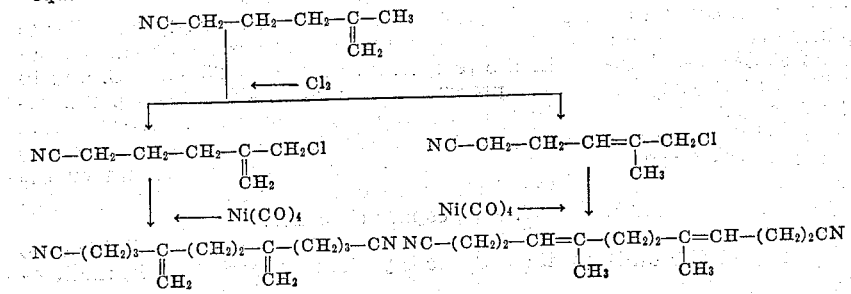

one-half hour period. After a few minutes the heat of reaction maintained the mixture at reflux without external heating. At the end of the chlorination period, nitrogen was passed through the mixture for approximately one hour, then the reaction product was poured into ice water, extracted with chloroform, washed with sodium bicarbonate, and given a crude distillation, which separated an undistillable residue containing 18.6% chlorine. Upon fractionation of the distillate, there was obtained 11 parts of unreacted 5-methyl-5-hexenenitrile. The chlorinated material consisted of three fractions:

I. 13.5 parts of a product containing 24.2% chlorine and boiling at 94–96° C. at 8 mm., $n_D^{25}$ 1.4641.

II. 92 parts of a product boiling at 104.5–106.5° C. at 5 mm., $n_D^{25}$ 1.4728. This product was 5-chloromethylhexenenitrile, obtained in 48% yield.

Analysis calculated for $C_7H_{10}NCl$: Cl, 24.69. Found Cl, 24.48, 24.49.

III. 30 parts of a product boiling at 125–126° C. at 6.5 mm., $n_D^{25}$ 1.4768. This material had the composition of a dichloroheptanenitrile.

Analysis calculated for $C_7H_{11}NCl_2$: Cl, 39.38. Found: Cl, 38.69, 38.67.

The identity of fraction II was confirmed by cyanating the chloronitrile by treatment with hydrogen cyanide in water containing calcium carbonate, according to the general procedure described in U. S. Patent 2,518,608. There was obtained an unsaturated dinitrile, B. P. 130–132° C. at 2 mm., $n_D^{25}$ 1.4629, having the composition $C_8H_{10}N_2$. The unsaturated dinitrile was then hydrogenated to the saturated dinitrile, and the saturated dinitrile was converted to the corresponding tertiary-butyl amide by reacting for 3 hours at 5–30° C. with tertiary-butyl alcohol and concentrated sulfuric acid in glacial acetic acid. There was obtained a tertiary-butylamide which was identical with the tertiary-butylamide of beta-methylpimelic acid, as shown by melting point and undepressed mixed melting point (137–138° C.) with an authentic sample of N,N'-ditertiary-butyl-beta-methylpimeldiamide, and by elementary analysis. This showed that the chlorination product of 5-methyl-5-hexenenitrile was either 5-chloromethyl-4-hexenenitrile or 5-chloromethyl-5-hexenenitrile. Infra-red spectrography showed that both isomers were present in the reaction product.

A stirred mixture of 100 parts of 5-chloromethyl hexenenitrile (obtained as described above) in 240 parts of methanol was treated gradually at 30–40° C. with 78 parts of nickel carbonyl dissolved in 80 parts of methanol, the addition requiring one and one-half hours. At the end of this period the reaction mixture had a deep red color. It was allowed to stand for an additional two-hour period at room temperature, at the end of which time the color had changed to green. The solvent was then evaporated at 100° C. and the residue was treated with excess 10% hydrochloric acid and extracted with chloroform. The extract was washed successively with sodium bicarbonate and water, dried and distilled. There was obtained 11 parts of unreacted 5-chloromethylhexenenitrile and 51 parts (76% yield) of a product boiling at 158–160° C. at 0.6 mm., $n_D^{25}$ 1.4824. This was a mixture of the isomeric 5,8-dimethylenedodecanedinitrile and 5,8-dimethyl-4,8-dodecadienedinitrile.

Analysis calculated for $C_{14}H_2ON_2$: N, 12.95. Found: N, 13.00, 13.11.

Example 2.—Fifty-one (51) parts of the dinitrile mixture obtained as in Example 1 was hydrogenated at 1500 lbs./sq. in. pressure and 50° C. in methanol solution with 1 part of 10% palladium-on-charcoal catalyst. There was obtained 44 parts of 5,8-dimethyldodecanedinitrile, B. P. 172° C. at 1 mm.

Example 3.—Forty-four (44) parts of 5,8-dimethyldodecanedinitrile was hydrogenated at 2500 lb./sq. in. pressure and 125° C. in the presence of 30 parts of anhydrous ammonia over 5 parts of Raney cobalt catalyst. There was obtained in 32% yield the corresponding 5,8-dimethyldodecamethylenediamine, B. P. 122–124° C. at 6.6 mm., neutralization equivalent 114.8 (calculated: 114.2).

In the first step of the process, i. e., the chlorination of 5-methyl-5-hexenenitrile, the reaction conditions may be varied rather widely. For example, the reaction temperature may be very low, e. g., −50° C., or it can be as high as 100° C. or even higher. Other inert solvents may be used, such as chloroform or tetrachloroethylene, or, if desired, the solvent may be omitted. Chlorination promoters such as ferric chloride, iodine, etc., may be used, and if desired hydrogen chloride absorbers such as pyridine can be present. In general, it is desirable not to use too large an excess of chlorine over the theoretical amount, in order to minimize the formation of polychlorinated products. Much less chlorine than the calculated quantity can be used, since the unreacted nitrile can be recovered and reused.

In the second step of the process, it should be noted that nickel carbonyl is a specific condensing agent. Conventional condensing agents such as magnesium, zinc or sodium are unsatisfactory in that they tend to promote cyclization. Nickel carbonyl may be prepared by known methods. It is a low boiling liquid soluble in many organic solvents.

The reactants are preferably used in approximately equivalent quantities, that is, two moles of 5-chloromethyl hexenenitrile per mole of nickel carbonyl, although an excess of one or the other, and preferably of nickel carbonyl, can be used. A solvent or diluent is not essential but is desirably used. The best solvents are the aliphatic alcohols of one to four carbon atoms since they dissolve both nickel carbonyl and the by-product, nickel chloride, but other inert diluents such as benzene, cyclohexane, di-n-butyl ether, etc. can be used.

The reaction temperature is not critical since the reaction is exothermic and proceeds at temperatures as low as −10° C. or even lower. In general, a reaction temperature between about 20 and 100° C. is preferred, although it can be as high as 150° C. or even higher. If desired, the reaction may be carried out under pressure in a closed vessel.

The progress of the reaction can be followed through the evolution of carbon monoxide. When this has substantially ceased, the reaction may be considered terminated.

Hydrogenation of the unsaturated dinitriles to the saturated dinitrile is preferably carried out in the temperature range of 25°–100° C. and in the pressure range of 50–2000 lbs./sq. in., although higher temperatures and pressures can, of course, be used. The preferred catalysts are platinum, palladium, nickel, ruthenium or the metal chromites disclosed in U. S. Patent 2,137,407, e. g., copper chromite.

Hydrogenation of the saturated dinitrile to the diamine is preferably carried out in the temperature range of 100°–200° C. and in the pressure range of 100–500 atmospheres, although the temperature can be as high as the decomposition point of the reactants and the pressure can be as high as the equipment will withstand. The preferred catalysts are the specially prepared nickel known as Raney nickel and the alloy-skeleton cobalt described in U. S. Patent 2,257,800. It is, in general, preferable to carry out this step in the presence of anhydrous ammonia to minimize secondary amine formation by reaction between the amino and cyano groups.

The unsaturated dinitriles of this invention are useful as intermediates in the preparation of corresponding saturated and unsaturated dicarboxylic acids, esters, and amides, etc. and in the preparation of the corresponding diamine. The latter is useful in the preparation of monomeric diamides and of polyamides which can be made into fibers, films and other articles.

We claim:

1. A process for the preparation of 5,8-dimethyldodecamethylenediamine having the formula

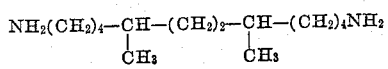

from 5-methyl-5-hexenenitrile having the formula

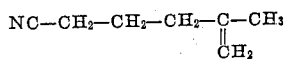

which comprises chlorinating 5-methyl-5-hexenenitrile in accord with the equation

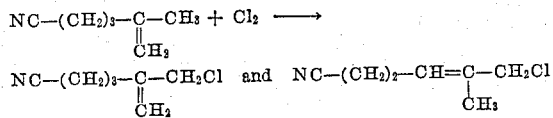

coupling said chlorinated products in the presence of nickel carbonyl to give isomeric unsaturated dinitriles, saturating the unsaturated dinitriles by hydrogenation and thereafter converting the terminal nitrile groups of the thus saturated products to amine groups by hydrogenation in the presence of ammonia.

2. The process of claim 1 in which the chlorination reaction is conducted at a temperature between —50° C. and 100° C. and in the presence of an inert solvent.

3. The process of claim 1 in which the coupling reaction is conducted in the presence of nickel carbonyl at a temperature between —10° C. and 150° C.

4. The process of claim 1 in which the saturation of the mixture of isomeric unsaturated dinitriles is accomplished by hydrogenation in the presence of a mild hydrogenation catalyst at a temperature between 25° and 100° C.

5. The process in accord with claim 1 in which the hydrogenation of the saturated dinitriles to the corresponding amine is conducted in the presence of ammonia and a hydrogenation catalyst at a pressure between 100 and 500 atmospheres and a temperature between 100° and 200° C.

6. As a new composition of matter a mixture containing as the primary constituents thereof 5,8-dimethylenedodecanedinitrile having the formula

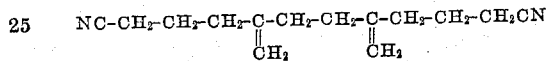

and its isomer 5,8-dimethyl-4,8-dodecadienedinitrile having the formula

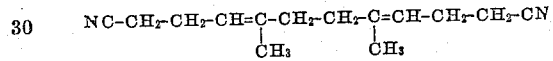

7. In a process for the preparation of 5,8-dimethylenedodecanedinitrile, the step which comprises coupling chlorinated 5-methyl-5-hexenenitrile in the presence of nickel carbonyl at a temperature between —10° C. and 150° C.

MILTON J. HOGSED.
ROBERT M. JOYCE.

REFERENCES CITED

The following references are of record in the file of this patent:

UNITED STATES PATENTS

| Number | Name | Date |
|---|---|---|
| 2,524,833 | Prichard et al. | Oct. 10, 1950 |